United States Patent
Dahan et al.

(10) Patent No.: US 9,316,210 B2
(45) Date of Patent: Apr. 19, 2016

(54) APPARATUS AND METHOD FOR GENERATING USEFUL ENERGY

(75) Inventors: Elodie Dahan, Lausanne (CH); Anna Laromaine Sagué, Barcelona (ES)

(73) Assignee: OSMOBLUE SARL, Lausanne (CH)

( * ) Notice: Subject to any disclaimer, the term of this patent is extended or adjusted under 35 U.S.C. 154(b) by 25 days.

(21) Appl. No.: 14/343,193

(22) PCT Filed: Aug. 23, 2012

(86) PCT No.: PCT/EP2012/066412
§ 371 (c)(1),
(2), (4) Date: Mar. 6, 2014

(87) PCT Pub. No.: WO2013/034446
PCT Pub. Date: Mar. 14, 2013

(65) Prior Publication Data
US 2014/0197104 A1    Jul. 17, 2014

(30) Foreign Application Priority Data
Sep. 7, 2011 (CH) .......... 1468/11

(51) Int. Cl.
*B01D 61/00* (2006.01)
*C02F 1/44* (2006.01)
(Continued)

(52) U.S. Cl.
CPC .......... *F03G 7/00* (2013.01); *B01D 61/002* (2013.01); *B01D 61/005* (2013.01); *B01D 61/06* (2013.01);
(Continued)

(58) Field of Classification Search
CPC .... B01D 61/002; B01D 61/005; B01D 63/08; B01D 65/00; B01D 2311/10; B01D 2311/103; B01D 2311/106; B01D 2311/06; B01D 2311/04; B01D 2311/20; B01D 2311/25; B01D 2311/26; B01D 2311/2642; B01D 2313/36; B01D 2313/38; B01D 2313/90; B01D 2313/246; B01D 2315/10; F03G 7/00; Y02E 10/36; C02F 1/445; C02F 2303/10
See application file for complete search history.

(56) References Cited

U.S. PATENT DOCUMENTS 8,795,525 B2 *   8/2014   McGinnis et al. ....... 210/321.66
2006/0011544 A1 * 1/2006   Sharma et al. ............... 210/640
(Continued)

FOREIGN PATENT DOCUMENTS

WO     2009/037515 A2    3/2009

OTHER PUBLICATIONS

Ling et al. Facile synthesis of thermosensitive magnetic nanoparticles as "smart" draw solutes in forward osmosis. Chem. Commun., 2011, 47, 10788-10790.*
(Continued)

*Primary Examiner* — Katherine Zalasky
(74) *Attorney, Agent, or Firm* — Maschoff Brennan

(57) ABSTRACT

An apparatus for generating useful energy includes a first chamber containing a draw solution which includes an osmotic agent and a second chamber containing a feed solution. A semi-permeable membrane allows the feed solution to move thereacross by osmosis, from the second chamber to the first chamber, to form a diluted draw solution. Pressurizing means apply a pressure to the diluted draw solution in the first chamber. Energy conversion means convert mechanical energy in the diluted draw solution, which is generated by osmotic movement of the feed solution across the semi-permeable membrane, into useful, electrical energy. The osmotic agent includes particles in the range of 0.5 nm-5 mm and the semi-permeable membrane has pores with diameters that are no larger than the diameter of the particles, thereby improving the amount of power or useful energy generated by the apparatus. There is further provided a corresponding method of generating power or useful energy.

14 Claims, 2 Drawing Sheets

(51) Int. Cl.
*F03G 7/00* (2006.01)
*B01D 61/06* (2006.01)
*B01D 63/08* (2006.01)

(52) U.S. Cl.
CPC ............. *C02F 1/445* (2013.01); *F03G 7/005* (2013.01); *B01D 2311/10* (2013.01); *B01D 2311/20* (2013.01); *B01D 2311/25* (2013.01); *B01D 2311/2642* (2013.01); *B01D 2313/246* (2013.01); *C02F 2303/10* (2013.01)

(56) References Cited

U.S. PATENT DOCUMENTS

| | | | |
|---|---|---|---|
| 2006/0237366 A1* | 10/2006 | Al-Mayahi | 210/644 |
| 2007/0278153 A1* | 12/2007 | Oriard et al. | 210/637 |
| 2009/0297431 A1* | 12/2009 | McGinnis et al. | 423/580.1 |
| 2009/0308727 A1* | 12/2009 | Kirts | 203/11 |
| 2010/0024423 A1* | 2/2010 | McGinnis et al. | 60/649 |
| 2010/0183903 A1* | 7/2010 | McGinnis et al. | 429/50 |
| 2010/0224561 A1* | 9/2010 | Marcin | 210/644 |
| 2011/0044824 A1* | 2/2011 | Kelada | 417/53 |
| 2011/0272355 A1* | 11/2011 | Rajagopalan et al. | 210/650 |

OTHER PUBLICATIONS

Fundueanu et al. Fast-responsive porous thermoresponsive microspheres for controlled delivery of macromolecules. International Journal or Pharmaceutics 379 (2009) 9-17.*

* cited by examiner

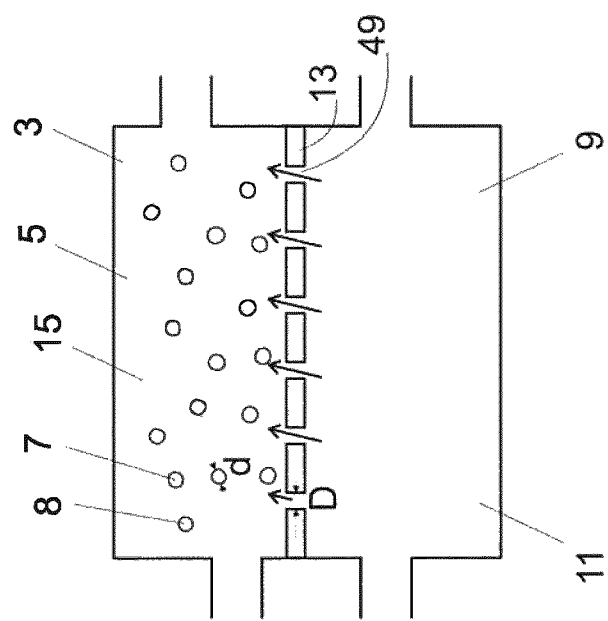

APPARATUS AND METHOD FOR GENERATING USEFUL ENERGY

FIELD OF THE INVENTION

The present invention relates to an apparatus and method for generating useful energy or power, and in particular, but not exclusively, to an apparatus and method which exploits the movement of a feed solution by osmosis, for generating useful energy or power.

DESCRIPTION OF RELATED ART

Systems which exploit osmosis to generate power are known. Typically these systems exploit pressure retarded osmosis; wherein feed solution moves, by osmosis, across a semi-permeable membrane, from a first chamber to a second chamber which holds a draw solution containing an osmotic agent; a pressure is applied to the draw solution in the second chamber. When the feed solution moves, by osmosis, across a semi-permeable membrane it mixes with the draw solution to form a diluted draw solution. The movement of the feed solution across the semi-permeable membrane by osmosis, together with the pressure which is applied to the draw solution in the second chamber, causes the diluted draw solution to flow. Turbines are typically used to convert the pressurized flow of the diluted draw solution into usable energy or power.

One particular example involves the provision of fresh water in the first chamber and sea water in the second chamber. The salt in the sea water acts as the osmotic agent. Pressure is applied to the sea water in the second chamber, and as the fresh water moves by osmosis from the first chamber to the second chamber to form a diluted draw solution, the diluted draw solution will flow. The flowing diluted draw solution is used to drive a turbine which in turn provided usable energy or power. Disadvantageously, this system generated very little useable energy or power. To increase the amount of useable energy or power, a plurality of these systems is usually provided. Disadvantageously, a plurality of these systems increases the cost and requires a larger amount of space.

Steps have been taken to improve the amount of power or useful energy, which is generated by systems which exploit osmosis. Various osmotic agents have been used to increase the flow of feed solution across the semi-permeable membrane i.e. to increase the osmotic potential. For example, it is known to use Ammonia and Carbon Dioxide as an osmotic agent. A system which uses Ammonia and Carbon Dioxide as an osmotic agent can provide up to 40 times more power or useful energy compared to those systems which use salt as an osmotic agent.

However, although the use of different osmotic agents have improved the amount of power, which is generated by systems which exploit osmosis, these system still do not provide a satisfactory amount of power.

The semi-permeable membranes used in the systems of the prior art have small pores to prevent osmotic agent (of small size) from the draw solution of the second chamber to permeate through the membrane into the first chamber. The small pores limit the solvent permeability of the membrane. The low solvent permeability will limit the flow of feed solution across the semi-permeable membrane; the low flow of the feed solution across the membrane will limit the amount of power or useful energy generated.

The semi-permeable membranes used in the systems of the prior art are susceptible to becoming clogged by particles within the feed solution, or by the osmotic agent within the draw solution. The clogging of the membrane will reduce the flow of feed solution across the semi-permeable membrane; the reduction in the flow of the feed solution across the membrane will reduce the amount of power or useful energy generated.

As the semi-permeable membranes are susceptible to clogging, it is necessary to clean the membrane regularly; thus the semi-permeable membranes used in the systems of the prior art require a high maintenance.

Increasing the size of pores in the semi-permeable membrane in order to increase its solvent permeability, will increase the risk of the osmotic agent to permeate through the membrane. Permeation of the osmotic agent will reduce the difference in concentration between the feed and the draw solutions in each chamber, reducing the osmotic potential within the system. A reduction in osmotic potential will result in a reduction in the flow of feed solution across the semi-permeable membrane; the reduction in feed solution flow across the membrane will reduce the amount of power or useful energy generated.

WO2009/037515 discloses an apparatus for recovering energy from an osmotic system, said apparatus comprising: a feed stream; pressure means to pressurize said feed stream; a manipulated osmosis unit; an energy recovery unit in fluid connection with second solution side of the manipulated osmosis unit; and a reverse osmosis unit receiving a feed from the energy recovery unit. Salt is used as an osmotic agent and evaporation is used to recover the osmotic agent.

It is an aim of the present invention to obviate, or mitigate, at least some of the above-mentioned disadvantages.

BRIEF SUMMARY OF THE INVENTION

According to the invention, these aims are achieved by means of an apparatus for generating useful energy, comprising, a first chamber which contains a draw solution which comprises an osmotic agent and a second chamber which contains a feed solution; a semi-permeable membrane which is arranged such that feed solution can move across the semi-permeable membrane by osmosis, from the second chamber to the first chamber, to form a diluted draw solution, a pressurising means, which is operable to apply a pressure to the diluted draw solution in the first chamber an energy conversion means, which is configured such that it can convert mechanical energy into electrical energy, wherein the energy conversion means is arranged such that it can convert mechanical energy of the pressurized diluted draw solution, which is generated due to the movement of the feed solution from the second chamber to the first chamber across the semi-permeable membrane by osmosis, into useful energy, wherein the osmotic agent comprises particles in the range 0.5 nm-5 mm and wherein the semi-permeable membrane comprises pores which have a diameter which are at most equal to the diameter of the particles of the osmotic agent, so as to improve the amount of power or useful energy which can be generated by the apparatus.

"Useful energy" is energy in a form which is suitable for a desired use. Useful energy includes, but is not limited to electrical energy. The useful energy can be used to power devices; thus the useful energy represents the generation of power.

The expression "movement of the feed solution across the semi-permeable membrane" means that only the solvent molecules and any particle, particulates or molecules contained in the feed solution, which have a diameter smaller than the diameter of the pores in the semi-permeable membrane will pass across the membrane. Any osmotic agent present in the feed solution, which has particles with diameters which are larger than the diameter of the pores in the semi-permeable membrane, will not pass through the semi-permeable membrane.

Preferably, the draw solution has a higher concentration of osmotic agent than the feed solution. Preferably, the feed solution comprises no osmotic agent. Preferably, the feed solution comprises at 0% concentration of osmotic agent.

A solvent which preferably does not contain any impurity may be used as an alternative to the feed solution. The solvent may be purified water for example. Any suitable solvent may be used.

Preferably, osmosis is pressure retarded osmosis.

The semi-permeable membrane may comprise pores which are configured to provide the semi-permeable membrane with a permeability of between 1.8-3.7e8 L.m2.h-1.bar-1. The semi-permeable membrane may comprise pores which are configured to provide the semi-permeable membrane with a permeability of between 3.7-3.7e5 L.m2.h-1.bar-1. The semi-permeable membrane may comprise pores which are configured to provide the semi-permeable membrane with a permeability of between 37-3.7e3 L.m2.h-1.bar-1. The semi-permeable membrane may comprise pores which are configured to provide the semi-permeable membrane with a permeability of 740.7 L.m2.h-1.bar-1.

The semi-permeable membrane may comprise pores which have a diameter between 0.25 nm-2.5 mm. The semi-permeable membrane may comprise pores which have a diameter between 0.25 nm-50 μm. The semi-permeable membrane may comprise pores which have a diameter between 0.5 nm-500 nm. The semi-permeable membrane may comprise pores which have a diameter of 10 nm.

The osmotic agent may comprise particles which have a diameter within the range 0.5 nm-5 mm. The osmotic agent may comprise particles which have a diameter within the range 0.5 nm-100 μm. The osmotic agent may comprise particles which have a diameter within the range 1 nm-1 μm. The osmotic agent may comprise particles which have a diameter of 20 nm. The particles may comprise any suitable organic material, inorganic material, metal, metal oxides, polymers or a combination of different materials. For example, the particles may each comprise a metallic core and a coating comprising an organic material such as a hydrophilic polymer. The particles may be configured such that they exhibit ferromagnetic, ferrimagnetic or superparamagnetic properties; for example the particles may comprise a ferromagnetic material. It will be understood that the osmotic agent may comprise any suitable material.

The particles of the osmotic agent may be porous, to increase the surface area of the particles. Increasing the surface area of the particles ensures that there is a larger area of the particles available to interact with a solvent of the draw solution; this leads to a higher amount of solvent per particle in the draw solution, which in turn leads to a higher osmotic power. With a higher osmotic power, the apparatus can generate more useful energy.

"Osmotic power" is the energy available from the difference in solute concentration between two solutions.

The particles of the osmotic agent may have any suitable shape. Preferably the particles of the osmotic agent will comprise a shape which increases the surface area of the particles. The particles of the osmotic agent may be ring-shaped, spherical-shaped, rod-shaped, figure-of-8 shaped, double ring shaped, and/or spiral-shaped.

The particles of the osmotic agent may comprise a surface coating to increase their affinity with a solvent of the draw solution and/or to prevent the particles from aggregating in the draw solution and/or to keep the particles stable in draw solution without degradation. The particles of the osmotic agent may comprise a surface coating to increase the stability of the draw solution.

The surface coating may comprise a hydrophilic material. Preferably, the surface coating comprises a hydrophilic material if the solvent of the draw solution is hydrophilic. Preferably, the surface coating comprises a hydrophilic polymer. The surface coating may comprise a hydrophobic material. Preferably, the surface coating comprises a hydrophobic material if the solvent of the draw solution is hydrophobic. Preferably, the surface coating comprises a hydrophobic polymer.

The apparatus may further comprise a means to recover at least some of the osmotic agent from the diluted draw solution. The means to recover at least some of the osmotic agent may comprise at least one selected from the group comprising, a magnet which provides a magnetic field; an electrical means which provides an electric field; a means for providing centrifugal force to the diluted draw solution; a means for filtering the diluted draw solution, a means for heating the diluted draw solution. The osmotic agent may be chosen according to the means to recover the osmotic agent. For example, if the means to recover the osmotic agent is a magnet, then the osmotic agent which comprises a ferromagnetic material may be used. The magnetic field may be provided by one or more permanent magnet or by one or more electromagnet.

The means for recovering the particles may comprise particles which comprise a thermoresponsive material. The thermoresponsive material preferably is configured to cooperate with particles of the osmotic agent. The thermoresponsive material preferably is configured to cooperate with particles of the osmotic agent in the diluted draw solution. The thermoresponsive material may be provided as a coating on particles. The thermoresponsive material may be one or more thermoresponsive polymers. The thermoresponsive material may exhibit hydrophilic or hydrophobic properties depending on the temperature. A change of temperature may induce aggregation of particles of the thermoresponsive material. The aggregation of the particles will enable the particles of the thermoresponsive material to be easily collected. The aggregation may be reversible so that particles can be redispersed into the draw solution. Preferably, the thermoresponsive material cooperates with the osmotic agent. The thermoresponsive material may cooperates with the osmotic agent in the draw solution. Preferably, the thermoresponsive material cooperates with the osmotic agent in the diluted draw solution. Thus the osmotic agent can be easily recovered from a diluted draw solution by adjusting the temperature of the diluted draw solution to induce aggregation of particles of the thermoresponsive material; as the particles of the thermoresponsive material cooperate with particles of the osmotic agent, the particles of the osmotic agent will also aggregate. The aggregation of the particles of the osmotic agent will facilitate the recovery of the osmotic agent from the diluted draw solution. Adjusting the temperature of the draw solution or diluted draw solution, so that the particles of the thermoresponsive material are redispersed, will cause redispersion of the osmotic agent.

The apparatus may further comprise one or more reservoirs to store a draw solution destined for the first chamber and to store feed solution destined for the second chamber. Preferably, the apparatus comprises a first reservoir which can store a draw solution which comprises the osmotic agent, and a second reservoir which can store a feed solution. The one or more reservoirs may be arranged in fluid communication with the means to recover at least some of the osmotic agent. The storing of a draw solution and feed solution, enables the storage of useful energy.

The apparatus may further comprise a mean to store the useful energy which is generated.

According to a further aspect of the present invention there is provided a method of generating useful energy comprising the steps of, providing first chamber with a draw solution which comprises an osmotic agent wherein the osmotic agent comprises particles in the range 0.5 nm-5 mm, pressurising the draw solution in the first chamber, providing a second chamber with a feed solution; moving the feed solution from the second chamber to the first chamber, across a semi-permeable membrane, by osmosis, to form a diluted draw solution, wherein the semi-permeable membrane comprises pores which have a diameter which are at most equal to the diameter of the particles of the osmotic agent; converting mechanical energy of the pressurized diluted draw solution, which is generated due to the movement of the feed solution from the second chamber to the first chamber across the semi-permeable membrane by osmosis, into useful energy.

The step of providing first chamber with a draw solution which comprises an osmotic agent, may comprise providing the first chamber with a draw solution which comprises an osmotic agent which comprises particles which have a diameter of 20 nm.

The particles may be porous, so as to increase the surface area of the particles.

The semi-permeable membrane may comprise pores which have a diameter of 10 nm.

The step of pressurising the draw solution in the first chamber may comprise, pressurising the draw solution in the first chamber with a pressure which is less than the osmotic pressure provided by the osmotic agent.

The method may further comprise the step of providing the particles with a surface coating to improve the affinity of the particles to the solvent of the draw solution and/or to improve the stability of the particles in the solvent of the draw solution.

The method may further comprise the step of recovering at least some of the osmotic agent from the diluted draw solution. This may be achieved by at least one of, using a magnet which provides a magnetic field; using an electrical means which provides an electric field; using a means for providing centrifugal force to the diluted draw solution; using a means for filtering the diluted draw solution, using a means for heating the diluted draw solution, using a means for adding another compound to the diluted draw solution.

The step of recovering at least some of the osmotic agent may comprise the step of providing the diluted draw solution with a thermoresponsive material. The thermoresponsive material preferably is configured to cooperate with particles of the osmotic agent. The thermoresponsive material may be provided as a coating on the particles. The thermoresponsive material may be one or more thermoresponsive polymers. The thermoresponsive material may exhibit hydrophilic or hydrophobic properties depending on the temperature. The step of recovering at least some of the osmotic agent may further comprise the step of changing the temperature of the diluted draw solution to induce aggregation of particles of the thermoresponsive material. The aggregation of the particles will enable the particles to be easily collected thus facilitating the recovery. The aggregation may be reversible so that particles can be redispersed into the draw solution. Preferably, the thermoresponsive material cooperates with the osmotic agent. Preferably, the thermoresponsive material cooperates with the osmotic agent in the diluted draw solution. Thus the osmotic agent can be easily recovered from a diluted draw solution by adjusting the temperature of the diluted draw solution to induce aggregation of particles of the thermoresponsive material; as the particles of the thermoresponsive material cooperate with particles of the osmotic agent, the particles of the osmotic agent will also aggregate. The aggregation of the particles of the osmotic agent will facilitate the recovery of the osmotic agent from the diluted draw solution.

The method may further comprise the step of storing useful energy generated.

The method may further comprise the step of storing a draw solution destined for the first chamber in a first reservoir and storing a feed solution destined for the second chamber in a second reservoir. Storing the draw and feed solutions in this manner enables the storage of energy.

The method may comprise the step of moving a draw solution, from a means for recovering at least some of the osmotic agent from the diluted draw solution, to a reservoir.

According to a further aspect of the present invention there is provided a device for dialysis, desalination, water treatment, diagnosis or drug delivery, comprising any one of the above-mentioned apparatuses.

According to a further aspect of the present invention there is provided an apparatus for dialysis, desalination, water treatment, diagnosis or drug delivery, comprising, a first chamber which contains a draw solution which comprises an osmotic agent and a second chamber which contains a feed solution; a semi-permeable membrane which is arranged such that the feed solution can move across the semi-permeable membrane by osmosis, from the second chamber to the first chamber, to form a diluted draw solution, wherein the osmotic agent comprises particles in the range 0.5 nm-5 mm and wherein the semi-permeable membrane comprises pores which have a diameter which are at most equal to the diameter of the particles of the osmotic agent.

BRIEF DESCRIPTION OF THE DRAWINGS

The invention will be better understood with the aid of the description of an embodiment, which is given by way of example only, and illustrated by the figures, in which:

FIG. 2 provides a magnified, perspective view of the semi-permeable membrane and draw solution used in the apparatus shown in FIG. 1.

DETAILED DESCRIPTION OF POSSIBLE EMBODIMENTS OF THE INVENTION

Figure 1:
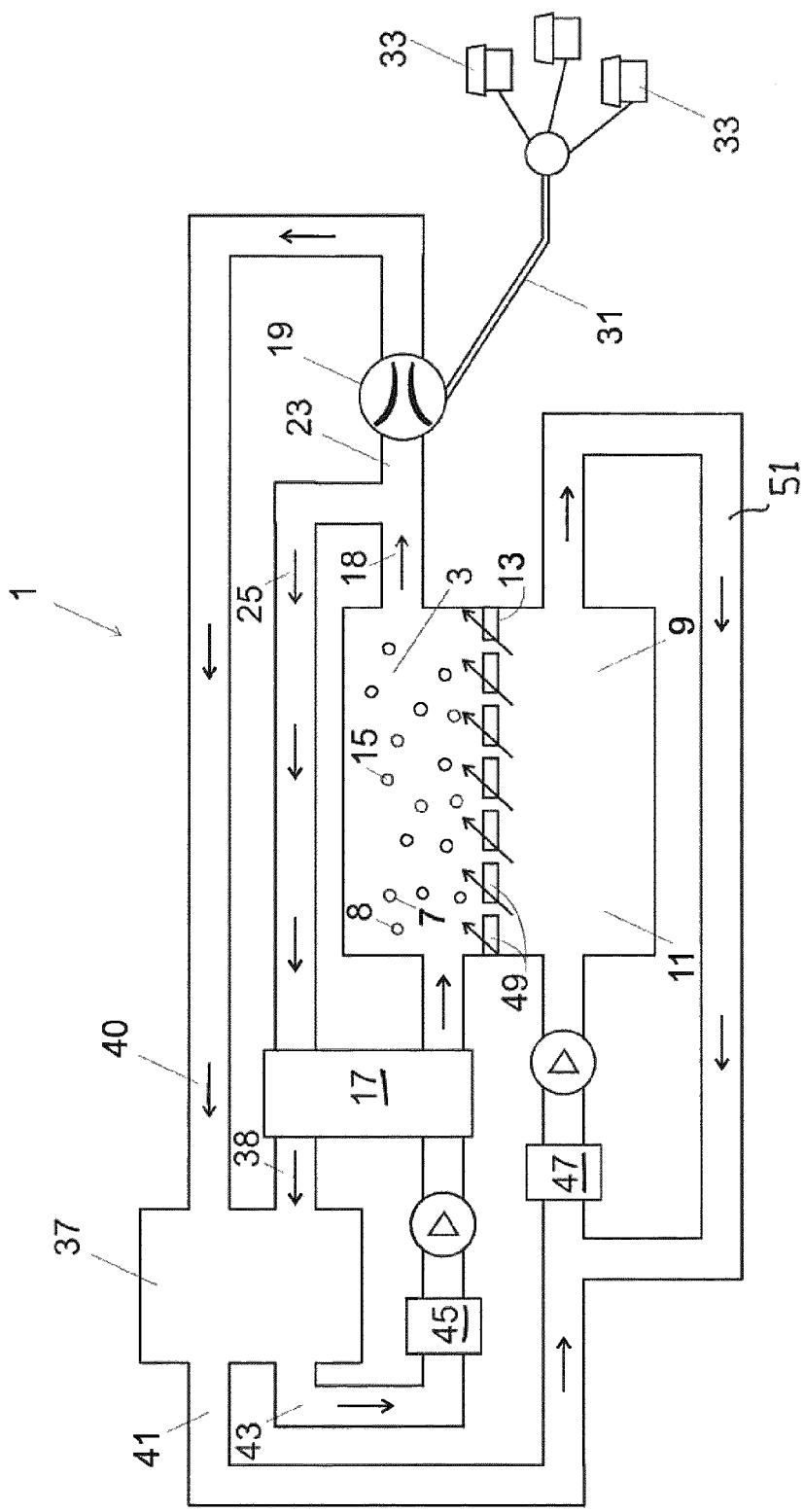
FIG. 1 provides a perspective view of an apparatus according to an embodiment of the present invention.

FIG. 1 provides a perspective view of an apparatus 1 for generating useful energy, according to an embodiment of the present invention.

The apparatus 1 comprises a first chamber 3 which contains a draw solution 5. The draw solution 5 contains an osmotic agent 7. As shown in the figure the osmotic agent comprises particles 8.

The apparatus 1 further comprises a second chamber 9 which contains a feed solution 11. The feed solution 11 contains no osmotic agent (or at least contains less osmotic agent 7 as is in the draw solution 5).

A semi-permeable membrane 13 is arranged within the apparatus 1 such that feed solution 11 contained in the second chamber 9 can move across the semi-permeable membrane 13, by osmosis, to the first chamber 3, to form a diluted draw solution 15.

A pressurising means 17 is provided, which is arranged to apply a pressure to the draw solution 5 and diluted draw solution 15 in the first chamber 3. The movement of the feed solution 11 from the second chamber 9 to the first chamber 3, across the semi-permeable membrane 13 by osmosis, combined with the pressure provided by the pressuring means 17, will cause the diluted draw solution 15 to flow out of the first chamber 3 via an exit conduit 18. Thus the diluted draw solution 15 will comprise kinetic energy.

The exit conduit 18 fluidly connects the first chamber 3 to an energy conversion means, in the form of a turbine 19. The conduit 23 is configured to direct flowing diluted draw solution 15 to the turbine 19. The turbine 19 is configured such that it can convert kinetic energy in the diluted draw solution 15, into useful energy. Useful energy is energy in a form which is suitable for a desired use. In this particular example the turbine 19 is configured to convert the kinetic energy of the diluted draw solution 15 into electrical energy.

The turbine 19 is in operable communication with a distribution network 31 which can distribute the electrical energy to houses 33, where the electrical energy can be used to power lights and home appliances, for example.

The apparatus 1 further comprises a means to recover at least some of the osmotic agent 7 from the diluted draw solution 15. In this particular example, the means to recover at least some of the osmotic agent 7 comprises a heating device 37. The heating device 37 is configured to receive diluted draw solution 15 which exits the first chamber 3 and also draw solution which exits the turbine 19, via input conduits 38, 40 respectively. The heating device 37 is operable to heat the diluted draw solution 15 so as to vaporise at least some of the solvent of the diluted draw solution 15 to provide recycled feed solution 41 and a recycled draw solution 43. The recycled draw solution 43 will be similar, to the draw solution 5 provided in the first chamber 3 and the recycled feed solution 11 will be similar to the feed solution 11 in the second chamber 9. The recycled draw solution 43 can be provided to the first chamber 3, for reuse; likewise the recycled feed solution 11 can be provided to the second chamber 9 for reuse.

It should be understood that the means to recover the osmotic agent 7 may comprise any suitable means. For example, the means may be a magnet which provides a magnetic field; such means is suitable when the osmotic agent 7 is made of (or partly made of) a material exhibiting ferromagnetic, ferrimagnetic or superparamagnetic properties. The magnetic field may be provided by a permanent magnet or by an electromagnet. The means to recover the osmotic agent 7 may be any of, an electrical means which provides an electric field; a means for providing centrifugal force to the diluted draw solution; a means for filtering the diluted draw solution, a means for heating the diluted draw solution. The means to recover the osmotic agent 7 may be selected depending on the type of osmotic agent 7 in the draw solution 5.

The apparatus further comprises a first reservoir 45 which can store a draw solution 5 destined for the first chamber 3 and a second reservoir 47 which can store feed solution 11 destined for the second chamber 9. In this particular example, the first and second reservoirs 45, 47 are arranged in fluid communication with the heating device 37; thus, the reservoirs 45,47 can receive recycled feed solution 41 and recycled draw solution 43 from the heating device 37.

FIG. 2 provides a magnified, perspective view of the semi-permeable membrane 13 and diluted draw solution 15 used in the apparatus shown in FIG. 1.

The osmotic agent 7 may comprise particles 8 which have a diameter 'd' in the range 0.5 nm-5 mm. Preferably, the osmotic agent 7 comprises particles 8 which have a diameter 'd' in the range 0.5 nm-100 μm. More preferably the osmotic agent 7 comprise particles 8 which have a diameter 'd' in the range of 1 nm-1 μm. In this particular example the osmotic agent 7 comprise particles 8 which have a diameter 'd' of 20 nm.

The particles may be made of any organic material, inorganic material, metal, metal oxides, polymers or a combination of different materials. Preferably the particles are made of a metal oxide coated with organic material. In this particular example the particles are made of ferric triacetylacetonate $(Fe(acac)_3)$ coated with poly(ethylene glycol) diacid (PEG-$(COOH)_2$).

The semi-permeable membrane 13 comprises pores 49 each of which have a diameter 'D' which are at most equal to the diameter 'd' of the particles 8 of the osmotic agent 7. The semi-permeable membrane 13 may comprise pores 49 which have a diameter 'D' between 0.25 nm-2.5 mm. Preferably the semi-permeable membrane 13 comprises pores 49 which have a diameter between 0.25 nm-50 μm. More preferably the semi-permeable membrane comprises pores 49 which have a diameter 'D' between 0.5 nm-500 nm. In this particular example, the semi-permeable membrane 13 comprises pores 49 which have a diameter 'D' of 10 nm.

The pores 49 in the semi-permeable membrane 13 may provide the semi-permeable membrane with a permeability of between 1.8-3.7e8 L.m2.h-1.bar-1; 3.7-3.7e5 L.m2.h-1.bar-1; or between 37-3.7e3 L.m2.h-1.bar-1. In this particular example, the pores 49 in the semi-permeable membrane 13 provide the semi-permeable membrane 13 of 740.7 L.m2.h-1.bar-1.

The particles 8 of the osmotic agent 7 may be configured to be porous, so as to increase the surface area of the particles 8. In this particular example the particles 8 are non-porous. It will be understood that the particles 8 of the osmotic agent 7 may have any suitable shape which increases the surface area of the particles 8; for example, the particles 8 of the osmotic agent 7 may be ring-shaped, spherical-shaped, rod-shaped, and/or spiral-shaped. In this particular example the particles 8 are spherical-shaped.

The particles 8 of the osmotic agent 7 comprise a surface coating which increases the affinity of the particles 8 with a solvent of the draw solution 15. In this particular example the solvent of the draw solution 15 is hydrophilic and the surface coating therefore comprises a hydrophilic material in the form of a hydrophilic polymer.

Referring now to FIGS. 1 and 2; during use, the draw solution 5 containing the osmotic agent 7 is provided from the reservoir 45, to the first chamber 3. A feed solution 11 is provided from the reservoir 47, to the second chamber 9. The feed solution 11 contains no osmotic agent (or at least contains less osmotic agent 7 as is in the draw solution 5) so that the feed solution 11, can flow by osmosis, across the semi-permeable membrane 13, from the second chamber 9 to the first chamber 3. The flow of feed solution 11 across the semi-permeable membrane 13 forms a diluted draw solution 15 in the first chamber 3.

The pressurising means 17 operates to pressurise the draw solution 5 in the first chamber 3, as the feed solution 11 flows by osmosis into the first chamber 3. The pressurising means 17 will continue to apply pressure to the resulting diluted draw solution 15 in the first chamber 3.

The movement of the feed solution 11 by osmosis, from the second chamber 9 to the first chamber 3, combined with the pressure provided by the pressuring means 17, will cause the diluted draw solution 15 to flow. Thus, the diluted draw solution will comprise kinetic energy.

Part of the diluted draw solution 15 will flow, via the exit conduit 23 to the turbine 19. The turbine 19 will operate to convert the kinetic energy in the diluted draw solution 15, into useful energy. In this particular example the turbine 19 operates to convert the kinetic energy in the diluted draw solution 15, into electrical energy. The electrical energy in turn is fed to a distribution network 31 where it is distributed to supply electrical energy to houses 33. The diluted draw solution 15 that went through the turbine 19 is passed to the heating device 37, where it is heated to provide recycled draw solution and recycled feed solution, which are passed to reservoirs 45 and 47 respectively, where they can be stored for reuse.

Part of the diluted draw solution 15 is passed, via a second conduit 25, to the pressurizing means 17 and then to the heating device 37. In the pressurizing means 17 the diluted draw solution 15 is used to pressurize the concentrated draw solution entering the first chamber 3. The pressure from the diluted draw solution is transmitted to the entering draw solution through the pressurizing means 17. The heating device 37 operates to recover at least some of the osmotic agent 7, or more specifically, in this case the heating device 37 operates to recover at least some of the draw solution 5 from the diluted draw solution 15. The heating device 37 heats the diluted draw solution 15 so as to vaporise at least some of the solvent in the diluted draw solution 15; thus providing recycled feed solution 41 and recycled draw solution 43. It will be understood that other means for recovering the draw solution may be used; the means for recovering the draw solution may be dependent on the osmotic agent which is used; for example, if the osmotic agent comprises ferromagnetic material, then the means to recover the draw solution may comprise a magnet.

The recycled draw solution 43 is supplied to the first reservoir 45 where it is stored, destined to be supplied once again to the first chamber 3 for reuse. The recycled feed solution 41 is supplied to the second reservoir 47 where it is stored, destined to be supplied once again to the second chamber 9 for reuse.

Part of the feed solution 11 that did not permeate through the semi-permeable membrane 13, and that is flowing out of the second chamber 9, can be directed into a reservoir 47 via a feedback conduit 51.

The useful energy or power (W) which is generated by any system which exploits osmosis, is proportional to the flow (J) of feed solution 11 through the semi-permeable membrane 13 and the pressure gradient ($\Delta P$) between the feed solution 11 and draw solution 15:

$$W = J \times \Delta P$$

The flow (J) of feed solution 11 through the semi-permeable membrane 13 is proportional to the osmotic power ($\Delta \pi$) within the apparatus, the pressure gradient $\Delta P$ between the feed solution 11 and draw solution 15 and the membrane permeability (A):

$$J = A \times (\Delta \pi - \Delta P)$$

The osmotic power is dependent on the composition of the osmotic agent 7 which is in the draw solution 5 contained in the first chamber 3. Osmotic power is the energy available due to the difference in the osmotic agent concentration between the feed solution 11 and draw solution 5.

In this particular embodiment of the invention the apparatus 1 uses an osmotic agent 7 which has particles 8 which have a diameter 'd' of 20 nm. The large sized particles 8 enables larger diameter 'D' pores 49 to be provided in the semi-permeable membrane 13. The provision of larger pores 49 increases the permeability of the semi-permeable membrane 13 which thus increases the power, or useful energy, which can be generated by the apparatus 1.

Additionally, as the osmotic agent 7 will comprise larger sized particles, the particles 8 of the osmotic agent 7 are less likely to pass through the semi-permeable membrane; thus osmotic potential is maintained within the apparatus 1. Due to the larger size of the particles 8 in the osmotic agent 7, the pores 49 in the semi-permeable membrane 13 can now have broader range of diameter "D". Furthermore, due to the larger size particles 8 in the osmotic agent 7, the ratio between the size of the particles 8 of the osmotic agent 7 and the pores 49 is increased. Preferably the ratio between the size of the particles 8 and the pores 49 is between 2 and 20. More preferably this ratio is between 2 and 5. In this particular example it is equal to 2. Accordingly, the semi-permeable membrane 13 is less susceptible to clogging. Due to the larger sized particles 8 of the osmotic agent 7, the diameter "D" of the pores 49 may be increased; more preferably, the diameter "D" of the pores 49 may be increased to increase flow through the semi-permeable membrane. Preferably the diameter "D" of the pores 49 is small enough compare to the diameter "d" of the particles 8 of the osmotic agent 7, to prevent clogging. The larger sized particles 8 will ensure that there is a greater size difference between the diameter "d" of the particles 8 of the osmotic agent 7 and the diameter "D" of the pores 49 i.e. the diameter "d" of the particles of the osmotic agent 7 is now much larger than the diameter "D" of the pores 49; as result clogging of the pores 49 in the semi-permeable membrane 13, by the particles 8 of the osmotic agent 7, is less likely to occur. The absence of clogging and maintenance of osmotic potential within the apparatus 1, will ensure that the flow of feed solution 11 across the semi-permeable membrane 13 is not compromised. Thus, over time, the apparatus 1 can maintain a high level of power generation or useful energy generation. Furthermore, the large particles 8 of the osmotic agent 7 allows more flexibility in choosing the appropriate pore 49 size for a given particle 8 size, without having to compromise the permeability of the semi-permeable membrane 13.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. An apparatus for useful energy, comprising:
   a first chamber which contains a draw solution which comprises an osmotic agent and a second chamber which contains a feed solution;
   a semi-permeable membrane which is arranged such that feed solution can move across the semi-permeable membrane by osmosis, from the second chamber to the first chamber, to form a diluted draw solution;
   a pressurising means, which is operable to apply a pressure to the diluted draw solution in the first chamber;
   an energy conversion means, which is configured such that it can convert mechanical energy into electrical energy, wherein the energy conversion means is arranged such that it can convert mechanical energy in the diluted draw solution, which is generated due to the movement of the feed solution from the second chamber to the first chamber across the semi-permeable membrane by osmosis, into useful energy,
   wherein the osmotic agent comprises particles with a diameter (d) in the range 0.5 nm-5 mm and wherein the semi-permeable membrane comprises pores which have a diameter which are at most equal to the diameter of the particles of the osmotic agent, so as to improve the amount of power or useful energy which can be generated by the apparatus, wherein the particles comprise thermoresponsive material which causes the osmotic agent to aggregate in the draw solution or diluted draw solution at a predefined temperature, to facilitate recovery of the osmotic agent.

2. An apparatus according to claim 1 wherein the semi-permeable membrane comprises pores which have a diameter between 0.25 nm-2.5 mm.

3. An apparatus according to claim 1 wherein the semi-permeable membrane comprises pores which have a diameter of 10 nm.

4. An apparatus according to claim 1 wherein the osmotic agent comprises particles which have a diameter within the range 1 nm-1 μm.

5. An apparatus according to claim 1 wherein the osmotic agent comprises particles which have a diameter of 20 nm.

6. An apparatus according to claim 1, wherein the particles of the osmotic agent are porous, so as to increase the surface area of the particles.

7. An apparatus according to claim 1, wherein the particles of the osmotic agent comprise a surface coating to increase their affinity with a solvent of the draw solution.

8. An apparatus according to claim 7 wherein the surface coating comprises a hydrophilic material.

9. An apparatus according to claim 1, further comprising one or more reservoirs to store a draw solution destined for the first chamber and to store feed solution destined for the second chamber.

10. A method of generating power comprising the steps of:
providing a first chamber with a draw solution which comprises an osmotic agent wherein the osmotic agent comprises particles in the range 0.5 nm-5 mm;
pressurising the draw solution in the first chamber;
providing a second chamber with a feed solution;
moving the feed solution from the second chamber to the first chamber, across a semi-permeable membrane, by osmosis, to form a diluted draw solution, wherein the semi-permeable membrane comprises pores which have a diameter which are at most equal to the diameter of the particles of the osmotic agent;
converting mechanical energy in the diluted draw solution, which is generated due to the movement of the feed solution from the second chamber to the first chamber across the semi-permeable membrane by osmosis, into electrical energy,
wherein the method further comprises the step of adjusting the temperature of the draw solution or diluted draw solution to cause aggregation of the osmotic agent.

11. A method according to claim 10 wherein the step of providing first chamber with a draw solution which comprises an osmotic agent, comprises providing the first chamber with a draw solution which comprises an osmotic agent which comprises particles which have a diameter of 20 nm.

12. A method according to claim 10 wherein the semi-permeable membrane comprises pores which have a diameter of 10 nm.

13. A method according to claim 10 wherein the step of pressurising the draw solution in the first chamber comprises, pressurising the draw solution in the first chamber with a pressure which is less than an osmotic pressure provided by the osmotic agent.

14. A method according to claim 10 further comprising the step of recovering at least some of the osmotic agent from the diluted draw solution.

* * * * *